United States Patent [19]

Shirato et al.

[11] Patent Number: 4,680,644
[45] Date of Patent: Jul. 14, 1987

[54] METHOD AND APPARATUS FOR READING AN IMAGE

[75] Inventors: Yoshiaki Shirato, Machida; Toshiyuki Komatsu, Yokohama; Shinichi Seito, Isehara; Tatsundo Kawai, Hiratsuka; Hirofumi Iwamoto, Machida; Katsumi Nakagawa, Kawasaki; Yasuo Kuroda, Sagamihara, all of Japan

[73] Assignee: Canon Kabushiki Kaisha, Tokyo, Japan

[21] Appl. No.: 755,797

[22] Filed: Jul. 17, 1985

[30] Foreign Application Priority Data

Jul. 23, 1984 [JP] Japan ................. 59-151379
Jul. 23, 1984 [JP] Japan ................. 59-151383

[51] Int. Cl.⁴ .................................... H04N 1/024
[52] U.S. Cl. ........................ 358/294; 358/280; 250/578; 250/214 AG; 250/214 C
[58] Field of Search ........... 358/282, 294, 213, 280; 250/578, 214 AG, 214 C, 214 DC

[56] References Cited

U.S. PATENT DOCUMENTS 4,133,008 1/1979 Tisue ..................... 250/214 AG
4,174,528 11/1979 White ..................... 358/294
4,341,956 7/1982 Bax ........................ 250/214 C Primary Examiner—Edward L. Coles, Sr.
Attorney, Agent, or Firm—Fitzpatrick, Cella, Harper & Scinto

[57] ABSTRACT

There is a method and an apparatus for reading an image in which the light emitted from a light source through an original is converted into an electric signal by a photoelectric converting device and is outputted as an image singal. In this method, a compensation light is radiated onto the photoelectric converting device and thereby causing a compensation signal to be generated therefrom; this compensation signal is stored into a memory; an original image is then read; and the read signal is compensated by the compensation signal stored in the memory. The compensation light corresponds to each intensity of lights which are obtained through a reference original to be read and which are received by the photoelectric converting device. By use of this method in an original reading section of a facsimile apparatus or the like, an ununiformity and a variation in signal of each bit which is read by the photoelectric converting device are compensated, so that a stable output image signal can be derived.

18 Claims, 14 Drawing Figures

METHOD AND APPARATUS FOR READING AN IMAGE

BACKGROUND OF THE INVENTION

1. Field of the Invention

The present invention relates to a method and an apparatus for reading an image and, more particularly, to a method and an apparatus for reading an image in which an ununiformity and a variation in signal of each bit which is read by a photoelectric converting device are compensated and thereby enabling a stability of an output signal to be improved.

A method and an apparatus for reading an image according to the present invention are applied to an original reading section such as, for example, a facsimile apparatus or the like and, particularly, to a contact line sensor.

2. Description of the Prior Art

Hitherto, in image signal reading apparatuses such as a facsimile apparatus or the like, a photo sensor of one-dimensional photo diode type consisting of crystal silicon is used. In such a kind of photo sensor, there are drawbacks such that there is a limitation of a length and a yield of products is low in terms of a size and a working accuracy of a silicon monocrystal which can be manufactured. Therefore, in the case where a width of an original to be read is large (for example, 210 mm), it is necessary to reduce and form an original image on a photo sensor using a lens system and then read it.

However, the use of such a reducing lens system makes it difficult to miniaturize the photo sensing section because the optical length becomes long. On one hand, if each image area of a photo sensor is made small to maintain a high resolution, a large quantity of light is needed to obtain a sufficient signal current.

Consequently, the foregoing photo sensor is used in a reading apparatus of the low-speed type in which the reading time is made long or of the type in which a high resolution is not required.

On one hand, a photo sensor of the photoconductive type using amorphous silicon (hereinbelow, referred to as a-Si) has recently been proposed.

This photoconductive type photo sensor is manufactured by forming a thin a-Si film on the surface of a glass substrate by way of a vacuum deposition method; therefore, a photo sensor of a large area or of a long scale can be easily manufactured. Thus, even in the case where a width of an original is large as well, the original image can be read at an equal magnification and the reading apparatus can be easily miniaturized.

However, the photoconductive type photo sensor using a-Si has such a nature that the sensitivity characteristic varies in dependence on the radiation time of the light. For example, assuming that a photo current of the photo sensor when the light radiation time is zero is 100%, in the case where the light of 100 lux is radiated for about 1000 hours, the photo current decreases to a level of about 50%. When the photo current decreases to a level below 50%, it cannot effectively function as a photo sensor.

Further, the photoconductive type photo sensor using a-Si has such a nature that a photo current changes in dependence on a change in circumstances. In particular, a sensitivity of the sensor varies depending on a temperature change and the reading operation becomes unstable.

In addition, in case of using such a photo sensor in an image reading apparatus, there occurs a problem as well such that it becomes difficult to output an electric signal which accurately corresponds to an original image due to causes such as ununiformity of the amounts of light emission of a light emitting device array such as LEDs or the like, a difference between the light amounts in the central and peripheral portions of the array in case of using the lens array of the refractive index distribution type, ununiformity of the sensitivities of the photoelectric converting device array, or the like.

To solve the above-mentioned problems, the following methods have conventionally been adopted. One of them is a method whereby prior to reading an actual original image, a white original serving as a reference which has been prepared is first read and the actual read image signal is compensated by way of the reference value.

However, this method has a problem such that it is necessary to exchange the original whenever the original is read and the whole image processing time becomes long.

On one hand, there has been proposed an apparatus in which the optical system is rotated by only a predetermined angle to form an optical path between a photo sensor and a white portion provided in close proximity to the original portion to be read. However, this apparatus has a problem such that its structure is complicated and the adjustment is difficult because it has a movable section.

Further, there has also been proposed a method whereby' the pure white portion is read; the compensation signal to which each ununiformity mentioned above was reflected is stored; the actual read signal of the original image is compensated using this compensation signal; and the image information which accurately corresponds to the original image is eventually outputted. However, even such a method also has problems such that it is necessary to always provide the pure white portion in an original or to read the pure white original just before the original is read and therefore the original to be read is limited, and also this causes an arrangement of the reading apparatus to become complicated, and the like.

SUMMARY OF THE INVENTION

The present invention is made in consideration of the above-mentioned conventional problems and it is an object of the invention to provide a method and an apparatus for reading an image in which the image information which accurately corresponds to an original is outputted by a simple arrangement.

Another object of the invention is to provide an image reading apparatus which can stabilize an output from a photoelectric converting device by a simple arrangement.

Still another object of the invention is to provide an image reading method whereby a compensation signal is generated by allowing the light for compensation to enter a photoelectric converting device, and an image is then read and the read signal is compensated by way of this compensation signal.

Further another object of the invention is to provide an image reading apparatus comprising a light source to radiate a reference light onto a photoelectric converting device and compensating means for compensating an output of a photoelectric converting device on the basis of an output of the foregoing photoelectric converting device onto which the reference light was radiated.

DESCRIPTION OF THE PREFERRED EMBODIMENTS DETAILED

Figure 1:
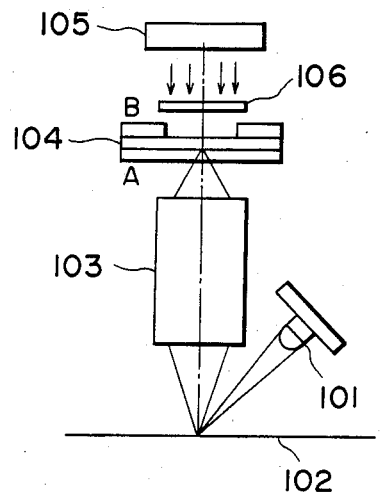
FIG. 1 is a schematic side elevational view showing an arrangement of a reading section in the first embodiment of an image reading apparatus according to the present invention.

Embodiments of the present invention will now be described in detail hereinbelow with reference to the drawings FIG. 1 is a schematic side elevational view showing an arrangement of a reading section in the first embodiment of an image reading apparatus according to the present invention.

In the diagram, a light from an LED array 101 is radiated like a line onto an original 102. The reflected light from the original 102 is transmitted through a compound-eye optical system (for example, an array-like focusing type light transmitting member such as a refractive index distribution type lens array, a rod-like lens array or the like, or an array-like compound-eye optical system such as a zone plate or the like is preferably used) 103 and enters the photo sensing surface of a photo sensor array 104 from the side A. On the other hand, a reference light from a compensation light source 105 is transmitted through a compensation filter 106 and enters the side B of the photo sensing suface. In this embodiment, the number of bits of the compensation light source 105 is the same as the number of bits of the photo sensor array 104.

Figure 2:
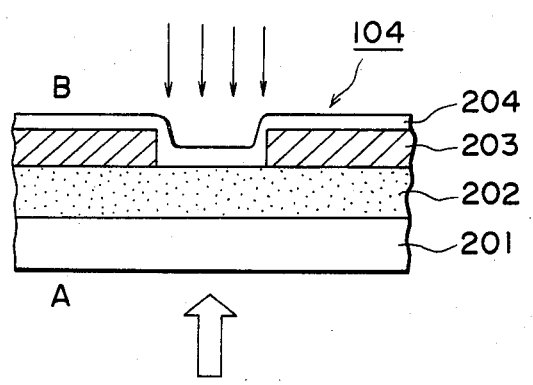
FIG. 2 is a schematic cross sectional view of a photo sensor.

The photo sensor array 104 consists of sensors which sense the lights transmitted from both of the front and back surfaces as described above. FIG. 2 shows a cross sectional view of one of those sensors.

The photo sensor array 104 is manufactures in the following manner. First, an amorphous silicon photoconductive layer 202 is formed on a glass substrate 201 by way of a glow discharge method. An electrode 203 is formed on the layer 202 by way of a deposition and a patterning. Further, a passivation film 204 consisting of silicon nitride is formed on the electrode 203 due to a glow discharge method or a CVD method. In this way, the planar type photo sensor array 104 is produced.

The photo sensor array 104 having such an arrangement can receive the lights at the photoconductive layer 202 from both sides A and B.

A method of manufacturing the compensation filter 106 will then be explained with reference to FIG. 3.

Figure 3:
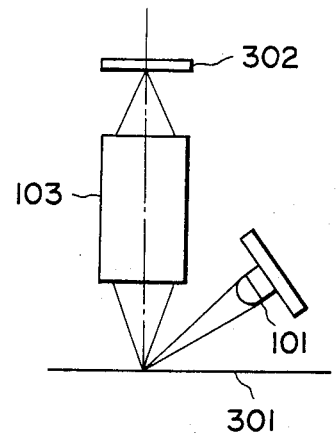
FIG. 3 is an arrangement diagram of an optical system to manufacture a compensation filter.

In FIG. 3, the LED array 101 and compound-eye optical system 103 are fixed at the same positions as those shown in FIG. 1. A white original 301 is arranged in a similar manner as the original 102. A photo sensitive plate 302 such as a photographic film or the like is fixed at the same position as the photo sensing surface of the photo sensor 104.

In this state, the LED array 101 is allowed to emit the light. This light is reflected by the white original 301 and is transmitted through the compound-eye optical system 103 and is radiated onto the photo sensitive plate 302, thereby exposing it. Therefore, an ununiformity of the amounts of the light emission of the LED array 101, the difference in light amount of the compound-eye optical system 103, or the like is recorded on the photo sensitive plate 302 as a difference in light intensity. By developing and fixing the photo sensitive plate 302, the compensation filter 106 is derived.

Such a photo sensor array 104 and compensation filter 106 are used in the reading section in this embodiment shown in FIG. 1. Therefore, the photo sensing surface of the photo sensor array 104 receives the reflected light from the original influenced by the LED array 101 and compound-eye optical system 103 from the side A and also receives the compensation light transmitted through the compensation filter 106 from the side B.

Figure 4:
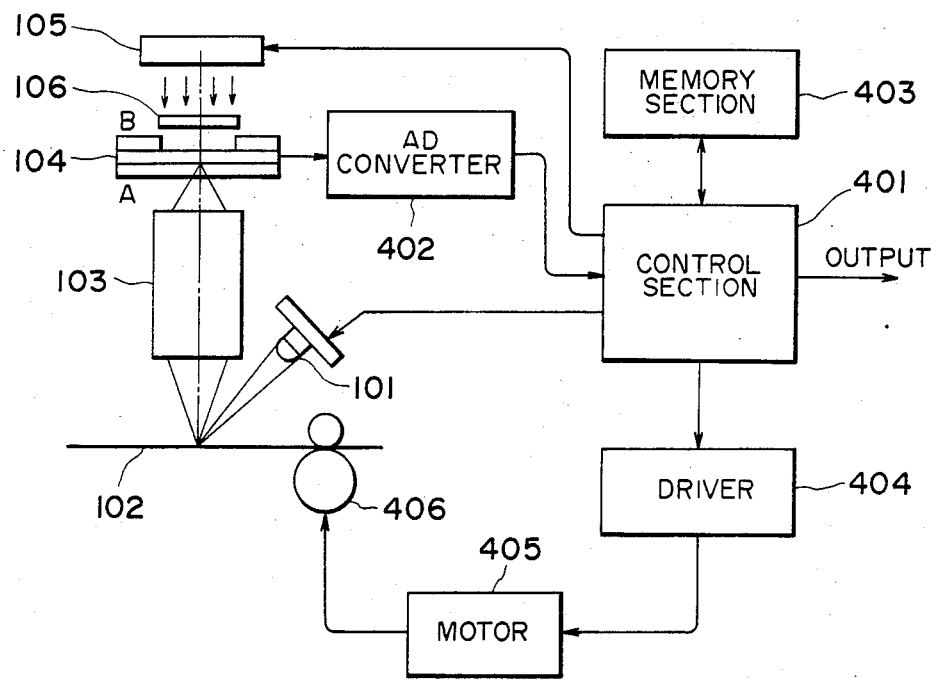
FIG. 4 is a schematic arrangement diagram of the first embodiment of the invention.

FIG. 4 is a schematic arangement diagram in this embodiment having the reading section shown in FIG. 1.

In FIG. 4, the LED array 101 and compensation light source 105 are connected to a control section 401. The operation to light on or off is repectively controlled by the control section 401.

Each output of the photo sensor array 104 is amplified by an amplifier (not shown) and thereafter it is converted into a digital signal by an AD converter 402 and is inputted to the control section 401.

Although not shown, the control section 401 includes therein selecting means for controlling the light-on timings for the LED array 101 and compensation light source 105 and arithmetic operating means. The control section 401 is also connected to a memory section 403 to store the compensation signal.

Further, the control section 401 controls a motor 405 through a driver 404. An original feed apparatus 406 is made operative by the motor 405.

Figure 5:
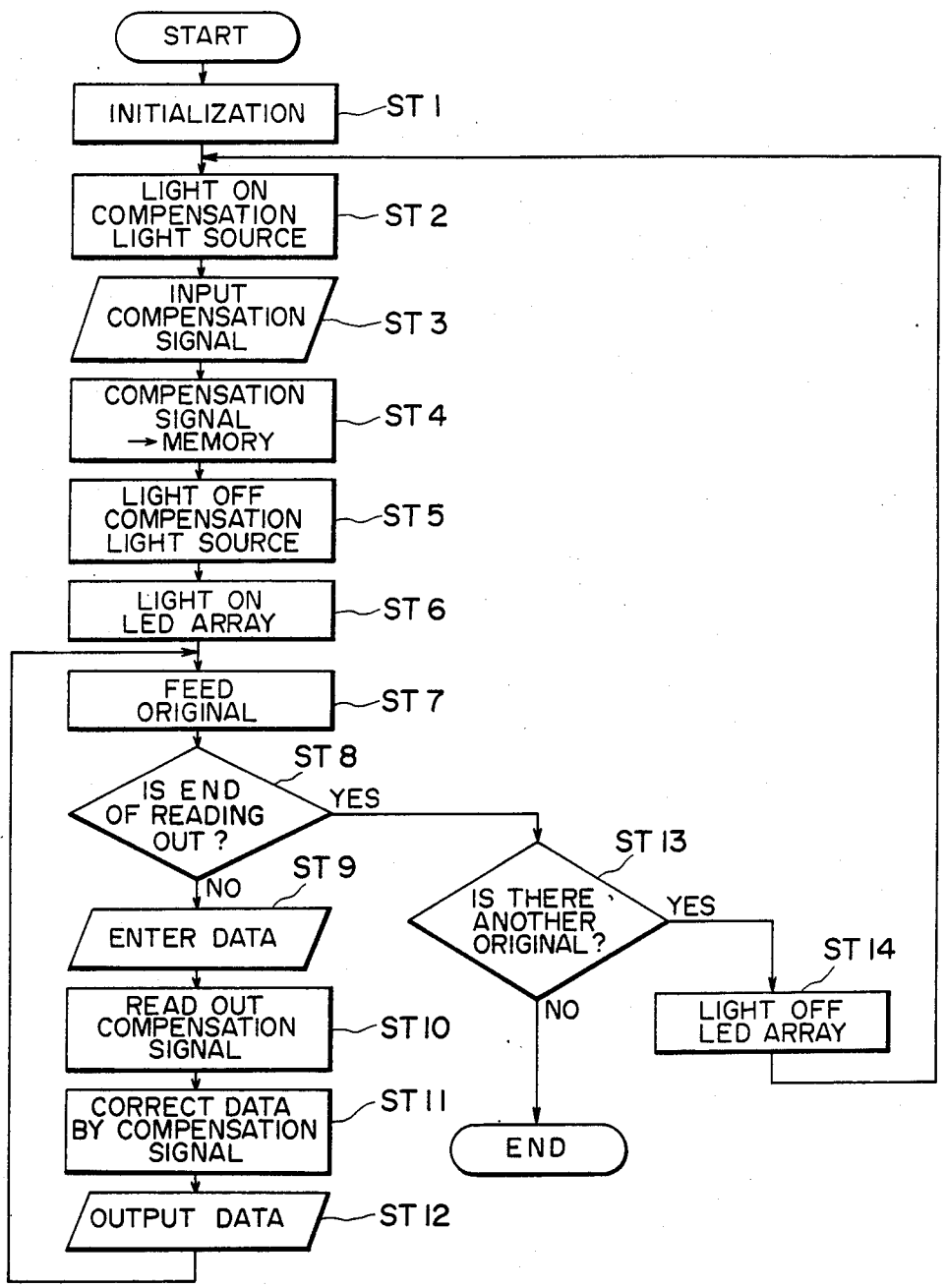
FIG. 5 is a flow-chart showing the first embodiment of an image reading method according to the present invention.

The operation in this embodiment having such an arrangement will then be described with reference to a flowchart of FIG. 5.

First, when a power source is turned on, the control section 401 performs a predetermined initialization (ST1) and then lights on the compensation light source 105 (ST2).

The light from the compensation light source is transmitted through the compensation filter 106 and becomes the compensation light and then enters the side B of the photo sensing surface of the photo sensor array 104. Due to this, a compensation signal corresponding to the compensation light is outputted from each electrode 203 of the photo sensor array 104 and is converted into a digital signal by the AD converter 402 and is inputted to the control section 401 (ST3).

Subsequently, the control section 401 stores the inputted compensation signal into the memory section 403 (ST4) and lights off the compensation light source 105 (ST5) and lights on the LED array 101 to read the original image (ST6). Therefore, only the reflected light from the original 102 enters the photo sensor array 104 from the side A.

Next, the control section 401 controls the motor 405 to move the original 102 (ST7) and checks to see if the original 102 is completely read or not (ST8). If it is not read yet (NO in ST8), the control section 401 inputs the original read signal from the photo sensor array 104 (ST9).

Subsequently, the control section 401 reads the compensation signal stored from the memory section 403 (ST10) and adds or subtracts it to or from the original read signal and thereby to compensate the data (ST11) and outputs it as an image signal (ST12).

In this way, the reading of one scanning line is finished. In a similar manner as above, the foregoing operations ST7 to ST12 are repeated, so that the original read signal is compensated for every scanning line and is outputted as an image signal.

Upon completion of the reading of the original 102 (YES in ST8), a check is made to see if the next original exists or not (ST13). When the next original exists (YES in ST13), the LED array 101 is lit off (ST14) and the operations in ST2 to ST5 mentioned above are again executed and the compensation signal is updated. In a similar manner as above, the foregoing operations ST7 to ST12 are repeated and the original is read.

As described above, the influences by the LED array 101 and compound-eye optical system 103 are eliminated by the compensation signal and further the compensation signal is updated. Consequently, ununiformity of the characteristics of the photo sensor array 104 and also the time-dependent changes and the environment-dependent changes are compensated, so that the original 102 is more accurately read.

In this embodiment, the case where the compensation signal is updated for every original has been shown as an example. However, the present invention is not limited to this case but the compensation signal may be updated at a desired interval, e.g., for every one line or every a plurality of originals, or the like.

Figure 6:
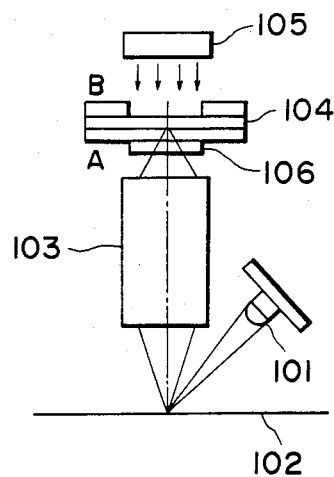
FIG. 6 is a schematic side elevational view showing an arrangement of a reading section in the second embodiment of an image reading apparatus according to the invention.

FIG. 6 is a schematic side elevational view of a reading section in the second embodiment of the present invention. The other arrangement is substantially the same as that in FIG. 4.

In FIG. 6, the compensation filter 106 is attached on the side A of the photo sensor array 104, thereby compensating ununiformity of the light intensities of the reflected lights from the original which enter each sensor of the photo sensor array 104. Therefore, the output of the photo sensor array 104 becomes the signal from which the influences of the LED array 101 and compound-eye optical system 103 have already been eliminated.

In addition, the time-depedent changes of the characteristics of the photo sensor array 104 can be solved in a similar way as the first embodiment, namely, in a manner such that the compensation light source 105 is lit on and the output of the photo sensor array 104 due to this is stored as a compensation signal into the memory section 403 and a compensation is performed.

Figure 7:
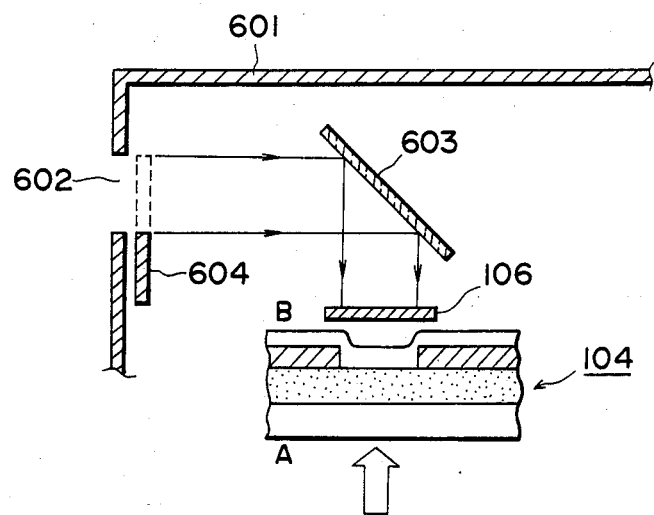
FIG. 7 is a schematic cross sectional view showing an arrangement of a part of a reading section in the third embodiment of an image reading apparatus according to the invention.

FIG. 7 is a schematic cross sectional view showing a part of a reading section in the third embodiment of the present invention.

In this embodiment, outside lights are used in place of the compensaiton light source 105.

Similarly to the first embodiment, the reflected lights from the original 102 enter from the side A of the photo sensor array 104. A window 602 is formed in a cover 601 and the outside lights which enter from the window 602 are deflected by a mirror 603 and are transmitted through the compensation filter 106, thereby forming the compensation light.

A shutter 604 is attached to the window 602 and the compensation light is allowed to enter or be cut off in dependence on the opening or closure of this shutter. The shutter 604 is opened or closed by driving means such as a motor or the like (not shown) and these opening and closure are controlled by the control seciton 401.

On one hand, to prevent that the outside lights from the window 602 unnecessarily enter the photo sensor array 104, it is necessary to provide a light shielding plate (not shown) to the photo sensor array 104.

Figure 8:
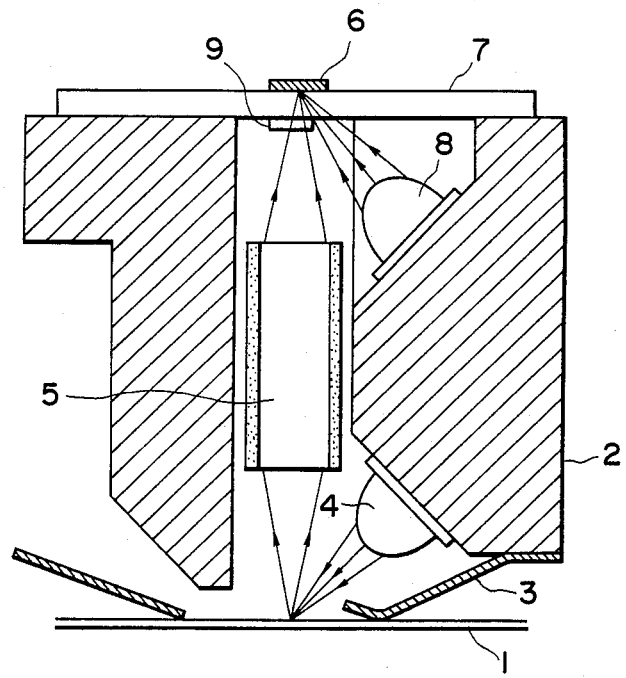
FIG. 8 is a schematic cross sectional view showing an arrangement of a part of a reading section in the fourth embodiment of an image reading apparatus according to the invention.

FIG. 8 is a cross sectional view of an optical reading section in the fourth embodiment of the present invention.

In the diagram, a reference numeral 1 denotes an original, 2 is a base plate, and 3 is a paper pressing device. An LED array 4 consisting of a number of light emitting devices and serving as a light source to illuminate the original 1 is arranged over the image reading position of the original 1. The lights radiated from the LED array 4 onto the original 1 are led to a focusing lens 5 and then radiate a sensor 6 serving as a photoelectric converter. A numeral 7 is a sensor supporting member. The intensity of the reflected light is converted into an electric signal by the sensor 6 and is outputted, thereby allowing the original image to be read. A numeral 8 is a monitor LED array to compensate an output value of the sensor 6 into an initial reference output value. This monitor LED array consists of a number of light emitting devices arranged in a line. These light emitting devices have the same performance and are adjusted such that the illuminance on the sensor surface becomes the same as that on the LED array 4. A compensation filter 9 is also arranged under the surface of the sensor supporting member 7.

Figure 9:
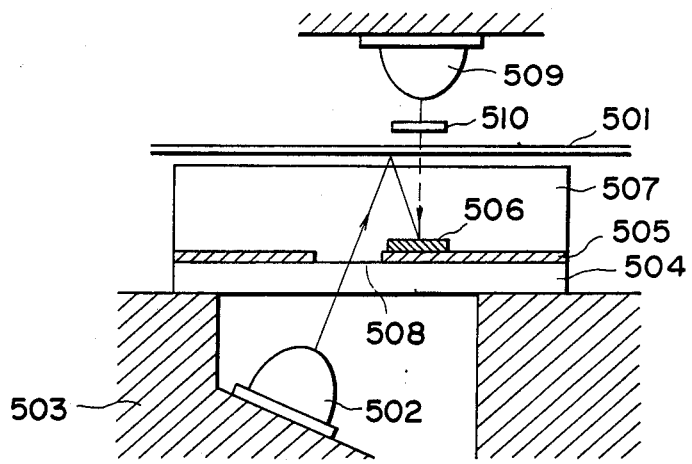
FIG. 9 is a schematic cross sectional view showing an arrangement of a part of a reading section in the fifth embodiment of an image reading apparatus according to the invention.

FIG. 9 is a cross sectional view of an optical reading section in the fifth embodiment of the present invention.

In FIG. 9, a reference numeral 501 denotes an original; 502 is an LEd array consisting of a number of light emitting devices; 503 is a base plate; and 504 is a glass substrate. A light shielding layer 505 consisting of a thin silicon film which is optically transparent, a sensor 506 and a transparent protecting layer 507 are formed on and over the glass substrate 504.

The lights radiated from the LED array 502 are transmitted through an illumination window 508 on the glass substrate 504 and are reflected by the original 501 and are radiated onto the sensor 506. The intensity of the reflected light is converted into an electric signal by the sensor 506 and is outputted, thereby allowing an original image to be read. A numeral 509 is a monitor LED array for directly radiating the sensor 506 before the original 501 is set and for compensating the output value of the sensor into an initial reference output value. This monitor LED array serves as a light source consisting of one or a plurality of light emitting devices which have the same performance and are adjusted such that the illuminance on the sensor surface becomes the same as that on the LED array 502. In the fifth embodiment, a compensation filter 510 is arranged in front of the monitor LED 509.

Figure 10:
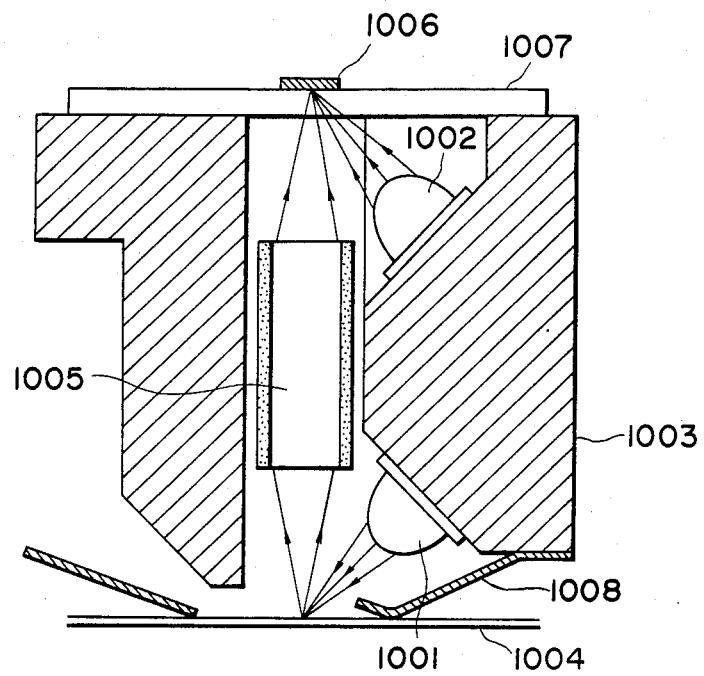
FIG. 10 is a cross sectional view of an optical reading section in the sixth embodiment of an image reading apparatus according to the invention.
Figure 11:
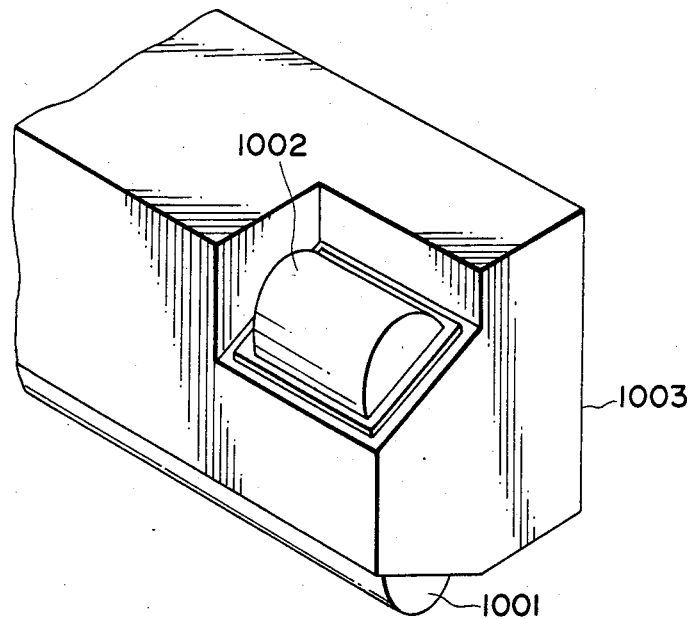
FIG. 11 is a perspective view of a light source section in FIG. 10.

FIG. 10 is a cross sectional view of an optical reading section in the sixth embodiment of an image reading apparatus according to the present invention. FIG. 11 is a perspective view of a light source section in FIG. 10.

In FIGS. 10 and 11, an LED array 1001 consisting of a number of light emitting devices and a monitor LED 1002 are fixed to a base plate 1003. The LED array 1001 is arranged so that their lights are radiated onto an original 1004. The reflected lights from the original 1004 are transmitted through a focusing type lens 1005 and are radiated onto a photo sensor array 1006.

The photo sensor array 1006 is fixed on a sensor supporting member 1007. The sensor supporting member 1007 is fixed to the base plate 1003.

On one hand, the monitor LED 1002 serves as a light source consisting of one or a plurality of light emitting devices having the same performance as that of the light emitting devices of the LED array 1001 and is arranged so as to be directly radiated onto the photo sensor array 1006. Further, the illuminance on the surface of the photo sensor array 1006 when the monitor LED 1002 emits the lights is adjusted such that when the original 1004 is white, the illuminance of the reflected light from the LED array 1001 becomes the same as that of the light which is radiated onto the photo sensor array 1006.

The original 1004 is conveyed by driving means (not shown) while the surface is maintained to become flat by way of a paper pressing device 1008 fixed to the base palte 1003.

Figure 12:
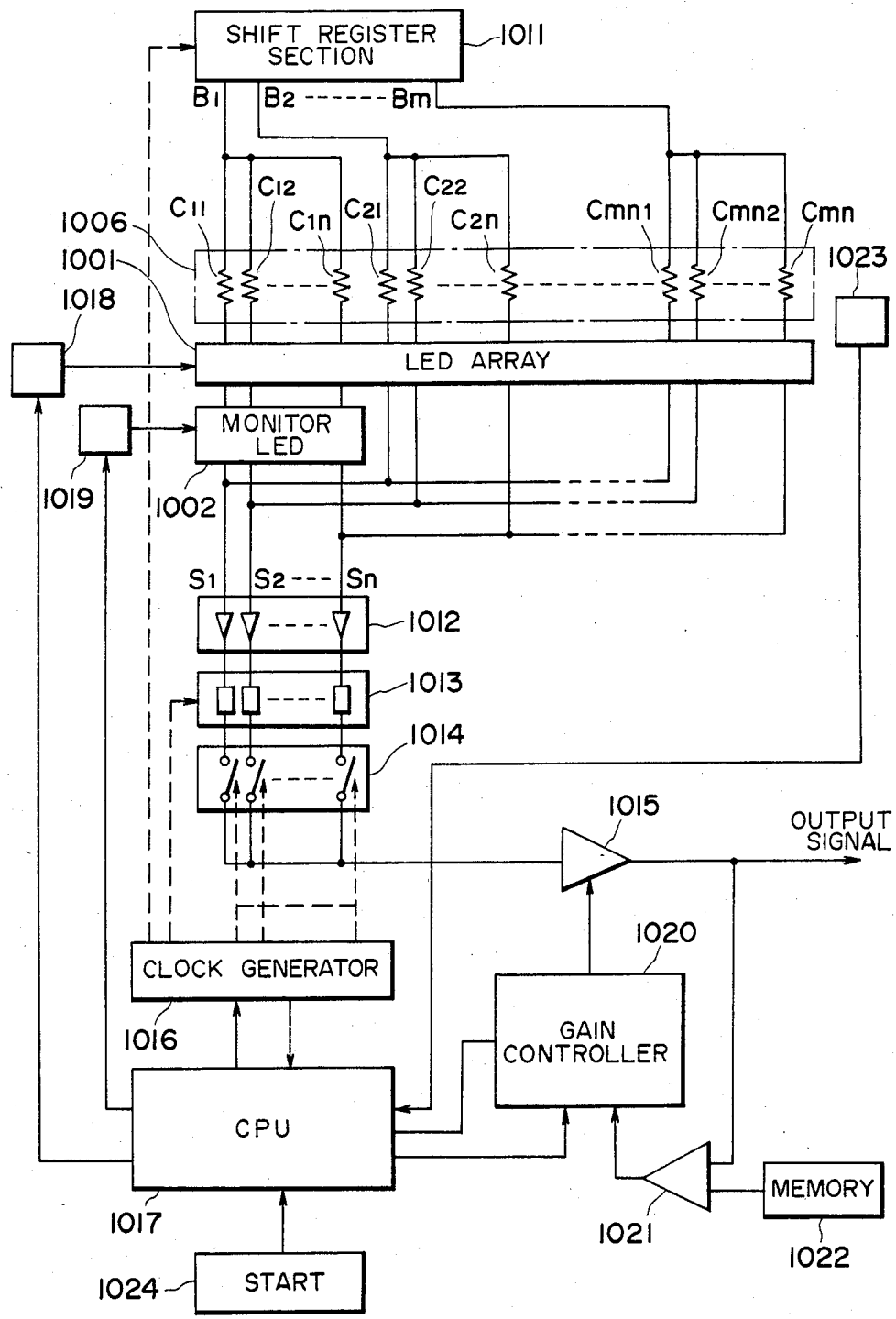
FIG. 12 is a block diagram showing the sixth embodiment.

FIG. 12 is a block diagram of the sixth embodiment.

In FIG. 12, the photo sensor array 1006 consists of m groups each including n photo sensitive devices. One terminal of each of the photo sensitive devices in each group is commonly connected. These m common connecting points are connected to common electrodes $B_1$ to $B_m$ in a shift register section 1011, respectively. The shift register section 1011 sequentially applies a predetermined voltage to one of the common electrodes $B_1$ to $B_m$ and thereby making the photo sensitive devices operative for every group.

The other terminals of the respective photo sensitive devices having the same sequence number in the respective groups are connected, respectively. These connecting points are coupled to individual electrodes $S_1$ to $S_n$ of a current amplifier 1012, respectively. Each output terminal of the current amplifier 1012 is connected to each input terminal of a sample-hold circuit 1013. Each output terminal of the sample-hold circuit 1013 is connected to each input terminal of a switching array 1014. Output termianls of respective switching transistors of the switching array 1014 are commonly connected and are connected to an input terminal of an amplifier 1015.

The shift register section 1011, sample-hold circuit 1013, and respective switching transistors of the switching array 1014 are made operative by clock pulses from a clock generator 1016, respectively.

A CPU 1017 controls driving power sources 1018 and 1019 to drive the LED array 1001 and monitor LED 1002 as well as the clock generator 1016.

Further, the CPU 1017 is connected to a gain controller 1020. The gain controller 1020 controls the gain of the amplifier 1015 on the basis of an output of a differential amplifier 1021. The differential amplifier 1021 receives an output of the amplifier 1015 and a reference output stored in a memory 1022 and then outputs a voltage corresponding to the difference between both of those outputs to the gain controller 1020.

The CPU 1017 is also connected to a sensor 1023 to detect an exchange of an original and receives a detection output from the sensor 1023. The CPU 1017 is made operative by way of a start button 1024 and starts the reading operation.

Figure 13:
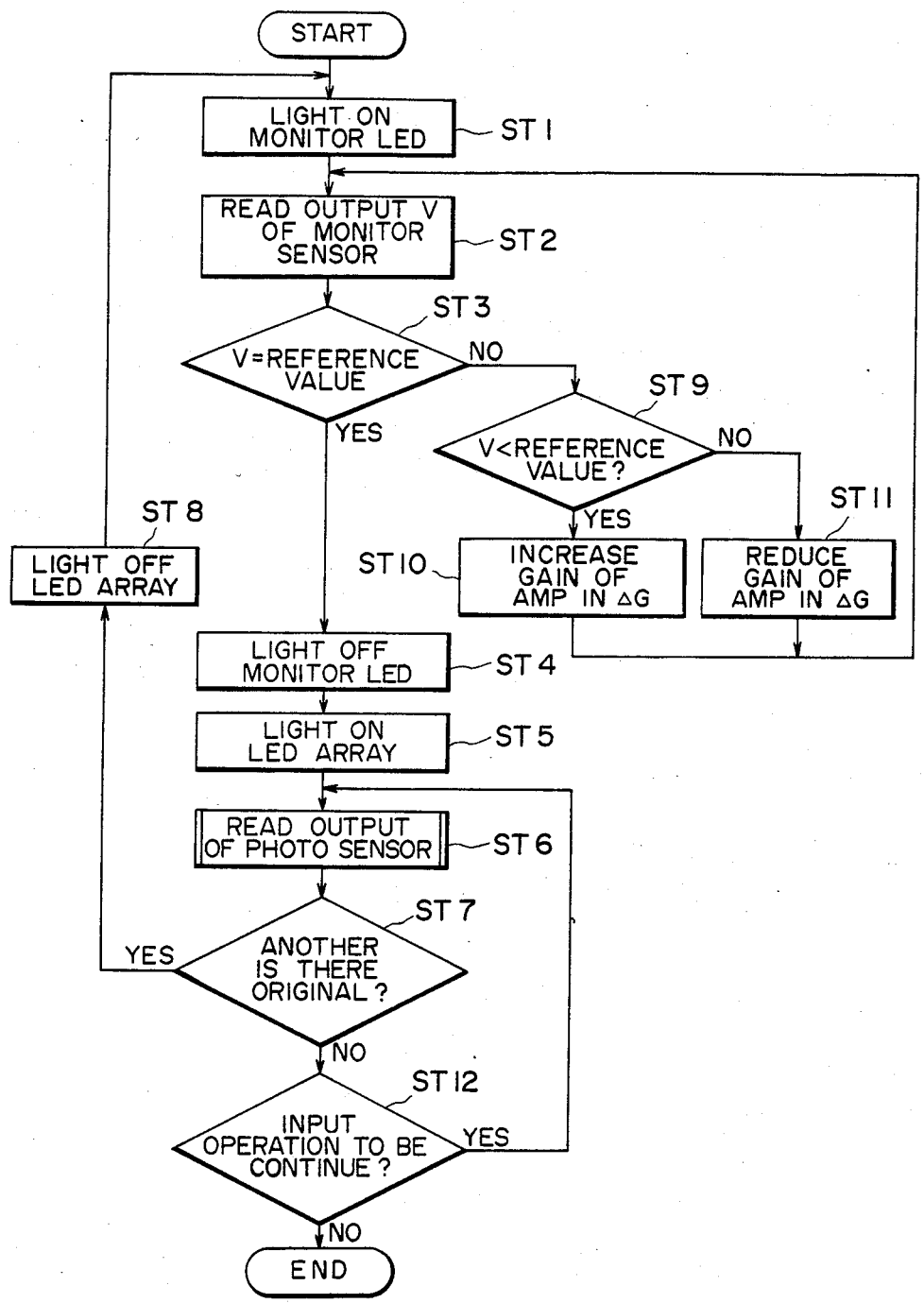
FIG. 13 is a flow-chart to explain the operation of the sixth embodiment.

The operation of the sixth embodiment having such an arrangement mentioned above will then be explained with reference to a flowchart of FIG. 13.

First, when the start button 1024 is turned on, the CPU 1017 makes the driving power source 1019 operative and thereby lighting on the monitor LED 1002 (ST1). In this case, it is assumed that the photo sensitive devices $C_{11}$ to $C_{ln}$ in the first group are radiated by the lights from the monitor LED 1002.

Next, outputs of the photo sensitive devices $C_{11}$ to $C_{ln}$ as monitoring sensors are read in the following manner (ST2).

First, the CPU 1017 makes the clock generator 1016 operative and thereby allowing a clock pulse to be generated to the shfit register section 1011. Thus, a predetermined voltage is applied to the common electrode $B_1$ of the shift register section 1011 and photo currents flow through the photo sensitive devices $C_{11}$ to $C_{ln}$ in the first group. After an expiration of the applied voltage response time of each photo sensitive device, the signal amplified by the current amplifier 1012 is temporarily stored into the sample-hold circuit 1013. The switching transistors of the switching array 1014 are sequentially made conductive in response to the clock pulses from the clock generator 1016. The signals temporarily stored into the sample-hold circuit 1013 are converted into a serial signal and are outputted to the amplifier 1015.

However, in this case, it is assumed that the photo sensitive device $C_{11}$ is selected as the monitoring sensor. Namely, the gain of the amplifier 1015 is controlled on the basis of a signal V from the photo sensitive device $C_{11}$.

After the output signal V of the photo sensitive device $C_{11}$ was read in this way (ST2), it is amplified by the amplifier 1015 and is inputted to the differential amplifier 1021. This signal is compared with a reference output signal preliminarily stored in the memory 1022 by the differential amplifier 1021.

If the output signal V is equal to the reference output signal (YES in ST3), an output of the differential amplifier 1021 becomes the zero level. When the signal at the zero level is inputted to the gain controller 1020, this controller sets the gain of the amplifier 1015 to an ordinary gain and also informs this ordinary gain setting to the CPU 1017.

When the output signal V equals the reference output signal, the CPU 1017 turns off the driving power source 1019 and thereby lighting off the monitor LED 1002 (ST4). Then, the CPU turns on the driving power source 1018 and thereby lighting off the LED array 1001 (ST5). The outputs of the respective photo sensitive devices of the photo sensor array 1006 are sequentially read (ST6).

For instance, it is assumed that the voltage is applied to the common electrode $B_1$ of the shift register section 1011 in response to a clock pulse from the clock generator 1016. Thus, photo currents flow through the photo sensitive devices $C_{11}$ to $C_{ln}$ in the first group connected to the common electrode $B_1$. These photo currents are amplified by the current amplifier 1012 and are stored into the sample-hold circuit 1013.

Subsequently, the switching transistors of the switching array 1014 are sequentially turned on in response to clock pulses from the clock generator 1016. The respective output signals of the photo sensitive devices $C_{11}$ to $C_{ln}$ in the first group stored in the sample-hold circuit 1013 are converted into a serial signal and are inputted to the amplifier 1015. In this way, the signals of the photo sensitive devices in the first group are outputted from the amplifier 1015.

In a similar manner as above, voltages are sequantially applied to the common electrodes $B_2$ to $B_m$ of the shift register section 1011, so that the output signals of the photo sensitive devices in the second to m-th groups are sequentially read. On one hand, the zero potential is applied to the common electrodes to which no voltage is applied and each input potential of the current amplifier 1012 is imaginary zero, so that no voltage is applied to the photo sensitive devices connected to the common electrodes to which no voltage is applied. Thus, no current flows.

By repeating the operations such that the signal of one line is read and then the original is moved in this way, whole origianl is read (ST6).

Next, the CPU 1017 checkes the presence or absence of a signal from the sensor 1023 for detecting the exchange of an original (ST7). If another original exists (YES in ST7), the LED array 1001 is lit off (ST8) and the monitor LED 1002 is lit on (ST1). When the output signal V of the photo sensitive device $C_{11}$ serving as a monitoring sensor is equal to the reference output signal (YES in ST3), the foregoing operations are repeated.

On the contrary, when the output signal V is not equal to the reference output signal (NO in ST3), the gain of the amplifier 1015 is compensated.

When the output signal V is smaller than the reference output signal (YES in ST9), a differential signal corresponding to the difference between both of those signals is inputted from the differential amplifier 1021 to the gain controller 1020. The gain controller 1020 increases the gain of the amplifier 1015 on the basis of this differential signal (ST10).

In the case where the output signal V is larger than the reference output signal (NO in ST9), the gain controller 1020 decreases the gain of the amplifier 1015 similarly on the basis of the differential signal from the differential amplifier 1021 (ST11).

As described above, the output signal V of the photo sensitive device $C_{11}$ is again read (ST2) and the foregoing compensating operation are repeated until the output signal V becomes equal to the reference output signal (YES in ST3).

Therefore, the output signal from the photo sensor array 1006 when an original image is read is always maintained at a constant level.

If another original does not exist (NO in ST7), the CPU 1017 checkes to see if the inputting operation is continued or not (ST12). If the inputting operation is not continued (NO in ST12), the operation is finished.

In the sixth embodiment, the case where the compensation is performed for every original has been shown as an example. However, the present invention is not limited to this. The compensation may be performed at a desirable interval, for example, for every one line or every a plurality of originals, or the like.

Figure 14:
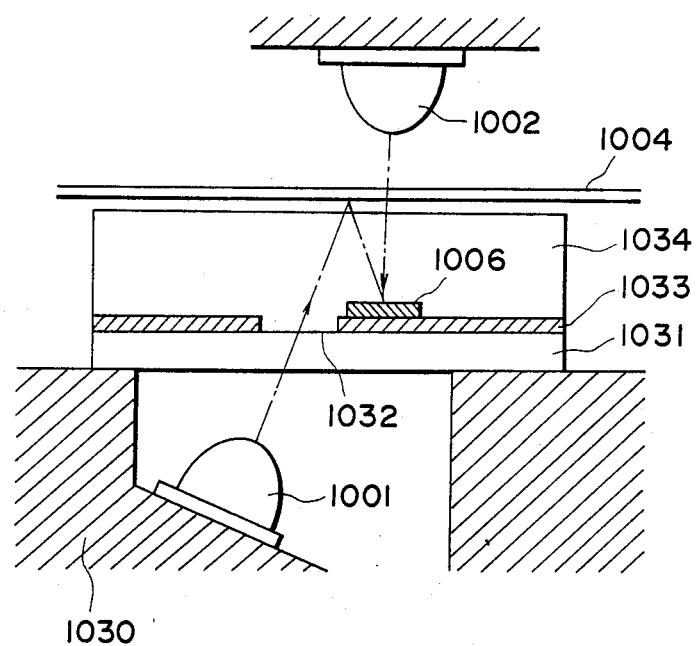
FIG. 14 is a cross sectional view of an optical reading section in the seventh embodiment according to the invention.

FIG. 14 is a cross sectional view of a reading section in the seventh embodiment of the present invention.

In FIG. 14, the LEd array 1001 is fixed to the concave portion of a base plate 1030 of the LED array 1001 and a glass substrate 1031 is mounted so as to cover this concave portion. A light shielding layer 1033 having an illumination window 1032 is formed on the glass substrate 1031. A photo sensor array 1006 is attached onto the light shielding layer 1033. The light shielding layer 1033 and photo sensor array 1006 are covered by a transparent protecting layer 1034. The monitor LED 1002 is arranged so as to directly radiate a part of the photo sensor array 1006. The original 1004 is conveyed between the monitor LED 1002 and the transparent protecting layer 1034. Therefore, the lights from the LED array 1001 are transmitted through the illumination window 1032 and are reflected by the surface of the original 1004. The reflected light is converted into an electric signal by the photo sensor array 1006.

The monitor LED 1002 serves as a light source consisting of one or a plurality of light emitting devices having the same performance as that of the light emitting devices of the LED array 1001 similarly to the foregoing sixth embodiment and is arranged so as to be directly radiated onto the photo sensor array 1006. Further, the illuminance on the surface of the photo sensor array 1006 when the monitor LED 1002 emits the lights are adjusted such that it becomes the same as the illuminance on the photo sensor array 1006 illuminated by the reflected lights from the LED array 1001 when the original 1004 is white.

Even if the reading section having such an arrangement as mentioned above is used, the stable output signal can be derived by use of such a circuit as shown in FIG. 12.

An application range of the present invention is not limited to the above-mentioned embodiments. The position of the monitor LED and the number of light emitting devices and the like can be arbitrarily determined as far as an image reading apparatus provided with such monitor LED and light emitting devices and the like has the same function as that of each apparatus in the foregoing embodiments.

The present invention can be also applied to a digital copying apparatus or any other apparatuses which input an image as well as a facsimile apparatus.

Further, the present invention is not limited to the apparatuses of the type in which the reflected lights from an original are received and thereby reading the information as in the foregoing embodiments but can be applied to any other apparatuses of the type in which information on a transparent original is illuminated by an LED array and the transmission lights are read by a photo sensor array.

As described in detail in the above, according to a method and an apparatus for reading an image of the present invention, it is possible to compensate ununiformity in an original reading signal which is caused due to a deterioration in sensitivity characteristic of a photoelectric converting device by way of the light radiation, a change in characteristic depending on circumstances, or the like by a simple arrangement.

In addition, by updating a compensation signal at a proper time interval, an output signal is suitably compensated and it is possible to derive an image signal which more accurately conforms with an original.

Further, since there is no need to exchange a reference white original prior to reading, the compensation of a sensitivity of a photoelectric converting device can be certainly performed in a short time.

What is claimed is:

1. An image reading method in which a light obtained through an object to be read is converted into an electric signal by a photoelectric converting means having opposed first and second surfaces and performing a reading, said method comprising the steps of:
    allowing a light for compensation to illuminate the second surface of said photoelectric converting means to cause a signal for compensation to be generated therefrom; and
    performing a reading of an image by illumianting the first surface of said photoelectric converting means and compensating the resulting read signal by use of said compensation signal.

2. An image reading method according to claim 1, further including a step of storing said compensation signal.

3. An image reading method according to claim 1, wherein said photoelectric converting means is of a both-side photo sensing type.

4. An image reading method according to claim 3, wherein said compensation light is allowed to enter one photo sensing surface of said both-side photo sensing type photoelectric converting means and said light obtained through said object to be read is allowed to enter the other photo sensing surface.

5. An image reading method according to claim 4, further including a step of storing said compensation signal.

6. An image reading method according to claim 1, wherein said compensation signal is updated at a desirable time interval.

7. An image reading method according to claim 1, wherein said compensation light is a reference light.

8. An image reading method according to claim 1, wherein said compensation light is a compensation light corresponding to each intensity of lights which are obtained through a reference object to be read and which are received by the photo sensing surfaces of said photoelectric converting means.

9. An image reading method according to claim 8, wherein said compensation light is formed by allowing a reference light to be transmitted through a film for compensation on which each intensity of the lights which are obtained through said reference 10. An image reading apparatus in which a light obtained from a light source through an object to be read is converted into an electric signal which is output as an image signal, comprising:
    a photoelectric converting means having opposed first and second surfaces;
    a light source to radiate a reference light onto said second surface of said photoelectric converting means; and
    compensating means for compensating an output of said photoelectric converting means wherein said output is based on the light obtained from said light source which illuminates said first surface through said object to be read, wherein said compensation is based on an output of said second surface of said photoelectric converting means, onto which said reference light was radiated.

11. An image reading apparatus according to claim 10, wherein the light obtained from the light source through said object to be read is a light reflected by said object to be read.

12. An image reading apparatus according to claim 10, wherein said light obtained from the light source through said object to be read is a light transmitted through said object to be read.

13. An image reading apparatus according to claim 10, wherein said compensating means consists of:
    memory means for storing a signal for compensation which is outputted when said photoelectric converting means receives the light from the light source to radiate the reference light; and
    arithmetic operating means for compensating a read signal when the photoelectric converting means receives the light obtained through the object to be read by use of said compensation signal.

14. An image reading apparatus according to claim 10, wherein a film for compensation on which each intensity of lights which are obtained through a reference object to be read and which are received by said photoelectric converting means was recorded is provided between a photo sensing surface of said photoelectric converting means and said light source to radiate said reference light.

15. An image reading apparatus according to claim 10, wherein a film for compensation on which each intensity of lights which are obtained through a reference object to be read was recorded is provided between said photoelectric converting means and said light source.

16. An image reading apparatus according to claim 10, wherein said photoelectric converting means is a photoelectric converting means of a both-side photo sensing type which is constituted in a manner such that one photo sensing surface receives the light from a light source to radiate said reference light and the other photo sensing surface receives the light obtained through the object to be read.

17. An image reading apparatus according to claim 10, wherein a film for compensation on which each intensity of lights which are obtained through a reference object to be read and which are received by said photoelectric converting means was recorded is provided between one photo sensing surface of said photoelectric converting means and said light source to radiate said reference light.

18. An image reading apparatus according to claim 10, wherein a film for compensation on which each intensity of lights which are obtained through a reference object to be read was recorded is provided between said photoelectric converting means and said light source.

* * * * *